United States Patent [19]

Boesewetter et al.

[11] Patent Number: 4,498,636
[45] Date of Patent: Feb. 12, 1985

[54] STATOR WINDING APPARATUS AND METHOD

[75] Inventors: Chester C. Boesewetter, Radford; Lawrence W. Langley, Christiansburg; John H. Mabie, Radford, all of Va.

[73] Assignee: Kollmorgen Technologies Corporation, Dallas, Tex.

[21] Appl. No.: 352,349

[22] Filed: Feb. 25, 1982

[51] Int. Cl.³ ............................................. B65H 54/10
[52] U.S. Cl. ..................................... 242/1.1 R; 29/596
[58] Field of Search ......................... 242/1.1 R, 7.08; 140/92.1; 29/596; 364/469, 565

[56] References Cited

U.S. PATENT DOCUMENTS

| | | | |
|---|---|---|---|
| 2,569,679 | 10/1951 | Leece et al. | 242/1.1 R |
| 2,967,672 | 1/1961 | Zwayer | 242/1.1 R |
| 3,226,046 | 12/1965 | Droll et al. | 242/1.1 R |
| 3,347,474 | 10/1967 | Frank | 242/1.1 R |
| 3,881,238 | 5/1975 | Mason | 242/1.1 R X |
| 4,033,385 | 7/1977 | Taube | 242/1.1 R X |

Primary Examiner—Stuart S. Levy
Assistant Examiner—David Werner
Attorney, Agent, or Firm—Morgan, Finnegan, Pine, Foley & Lee

[57] ABSTRACT

A computer controlled apparatus and method for winding electro-magnetic members such as stators comprising a stator holder, motor means for rotating the stator holder, a wire dispensing cylinder, motor means for moving the dispensing means longitudinal of the member to be wound, motor means for feeding wire to the wire dispensing cylinder and means for controlling the wire feed speed of the wire feeding motor means relative to the speeds of the motors for rotating the stator holder and longitudinally moving the wire dispensing cylinder, respectively.

12 Claims, 12 Drawing Figures

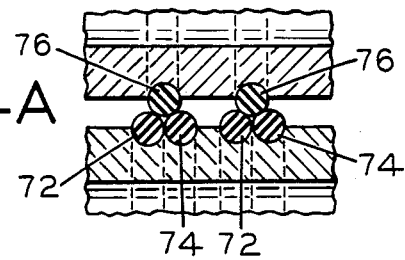
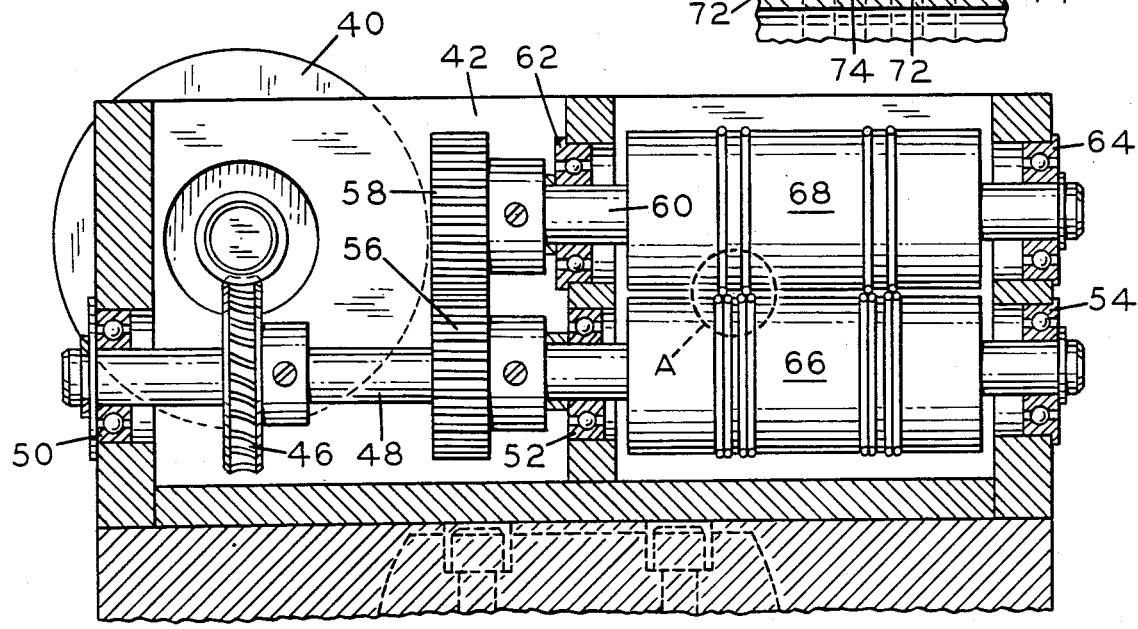
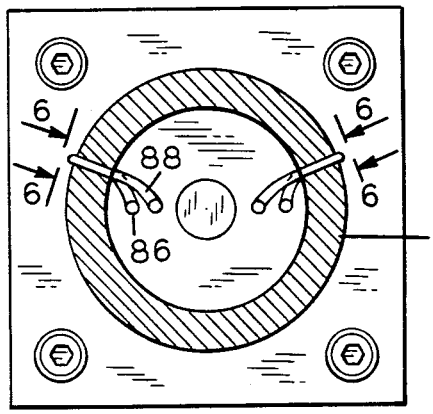
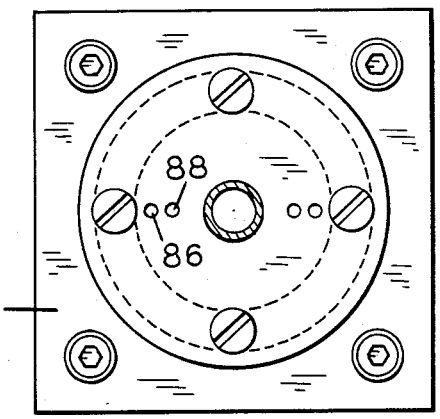
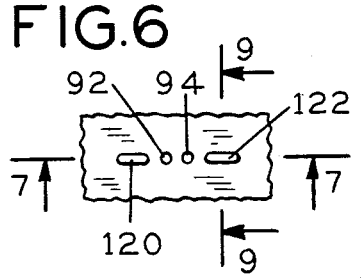
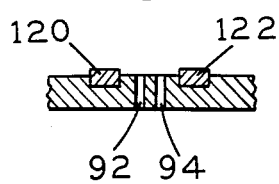
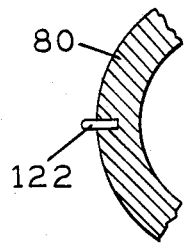

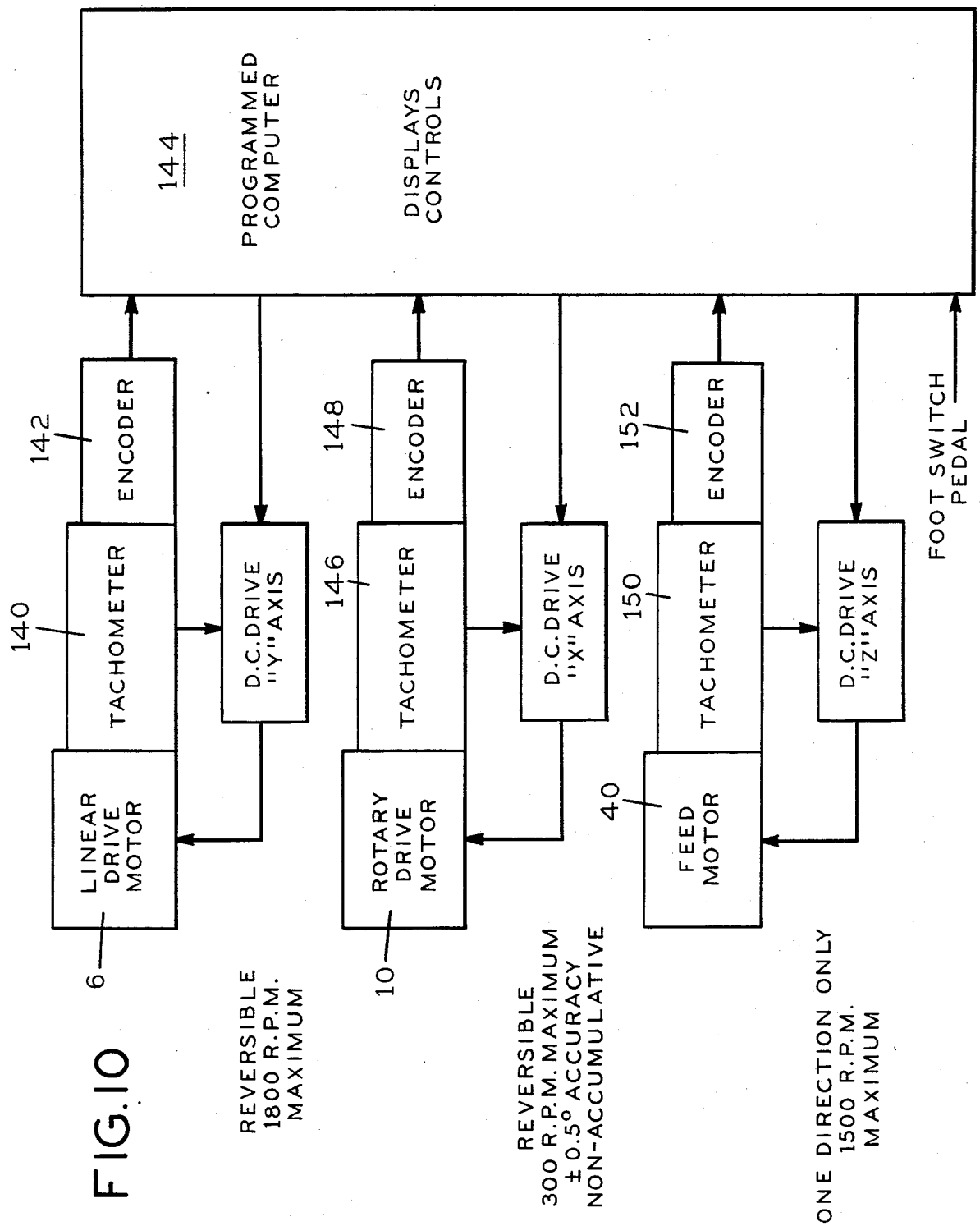

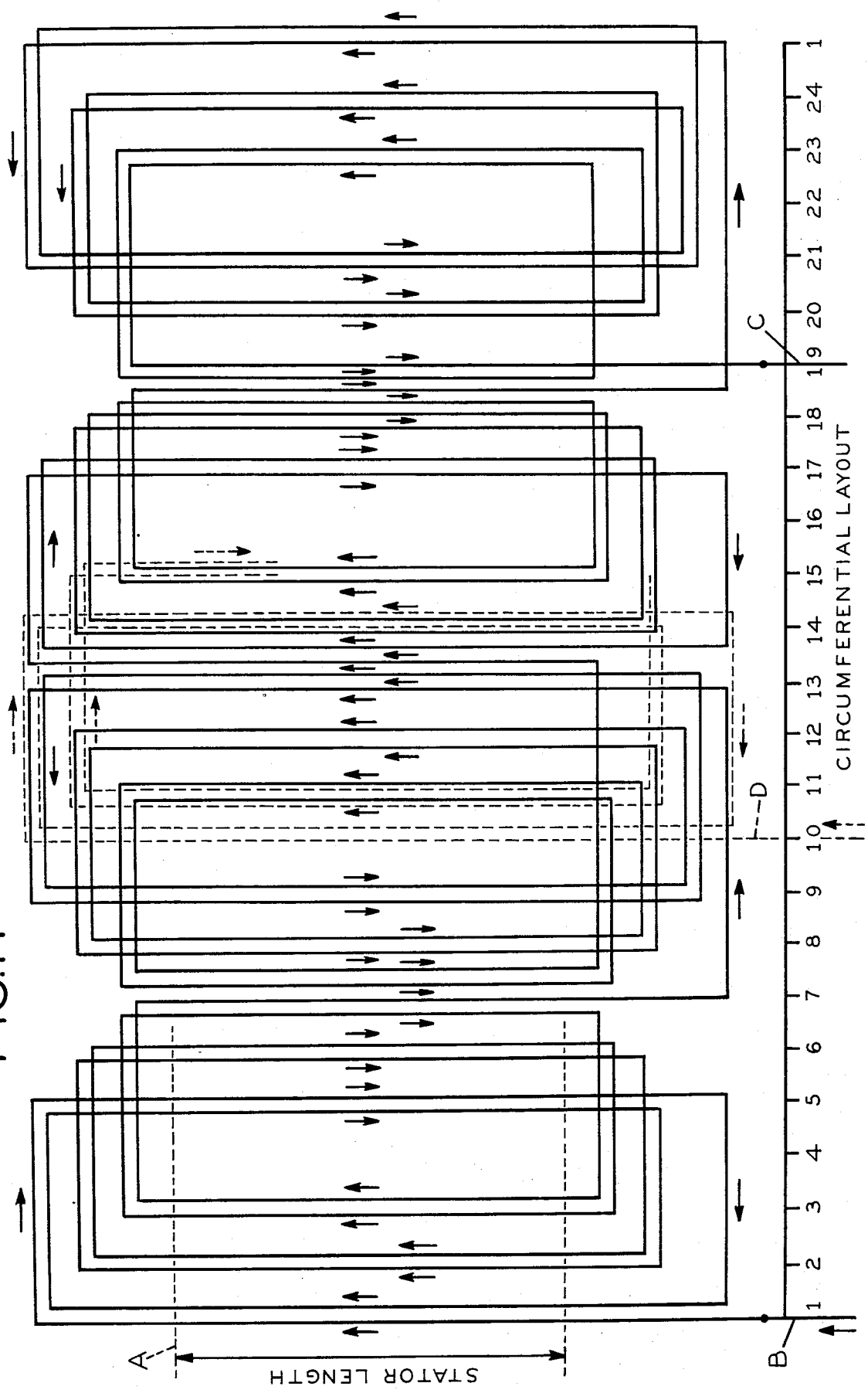

STATOR WINDING APPARATUS AND METHOD

This invention relates to a method and apparatus for winding electro-mechanical members, such as stators and, more particularly, for winding stators for induction motors.

It is common practice, in the high volume manufacture of induction motors for the appliance industry, to mass produce stators by winding such stators on mass production machinery. Such machinery is large and expensive and does not readily lend itself to medium and small volume production such as, for example, for the production of wound stators in quantities of one to one thousand stators.

Attempts, heretofore, have been made to produce wound stators in small volume production such as for brushless motors. In such attempts wire feeding and handling equipment, fixtures and jigs have been employed. However, such fixtures and jigs were found to interfere with the winding, slow down production and to be generally impractical.

The instant invention overcomes many of the problems heretofore encountered with methods and apparatus for small quantity production of wound stators for induction or brushless motors. In the instant invention, a hollow cylinder or tube is inserted through the stator to be wound. The hollow cylinder or tube fits snugly within the stator but with sufficient clearance to allow the cylinder or tube to be advanced and withdrawn through the stator and the stator to be rotated about the cylinder or tube. During the winding operation, the hollow cylinder or tube extends beyond the opposite ends of the stator.

The wire to be fed into the stator slots and make up the winding or windings is fed through the hollow cylinder or tube and through apertures in the cylinder or tube wall. Through pre-programmed digital control, the cylinder or tube is advanced and withdrawn through the stator while, at the same time, wire or wires to make up the winding or windings is fed through the cylinder or tube and apertures to the stator slots. After the wire fed through the apertures has completed the winding in such slot the stator is rotated on the cylinder or tube to the next slot and the cylinder or tube is advanced or withdrawn through the stator, as the case may be. Winding can be of one wire or a plurality of wires simultaneously in each slot. If desired, such as, for example, in multi-phase stators, a plurality of wires in a plurality of slots might be simultaneously wound.

The instant invention will be more fully described and better understood from the following description of a preferred embodiment taken with the appended drawings in which FIG. 1 is a side elevation view, partly in section at 1—1, FIG. 2, of the apparatus of the invention;

FIG. 4 is a sectional view taken at 4—4, FIG. 3;

FIG. 4A is an enlarged view of the portion shown in circle A, FIG. 4;

FIG. 5 is a sectional view taken at 5—5, FIG. 3;

FIG. 6 is an enlarged view taken at 6—6, FIG. 5;

FIG. 7 is a sectional view taken at 7—7, FIG. 6;

FIG. 8 is a view taken at 8—8, FIG. 3;

FIG. 9 is a sectional view taken at 9—9, FIG. 6;

FIG. 10 is a schematic diagram of the operation of the apparatus and equipment associated therewith in the use of such apparatus and the method of the instant invention; and FIG. 11 is a circumferential layout of a stator and stator slots showing a schematic layout of a winding representative of the instant invention.

Figure 1:
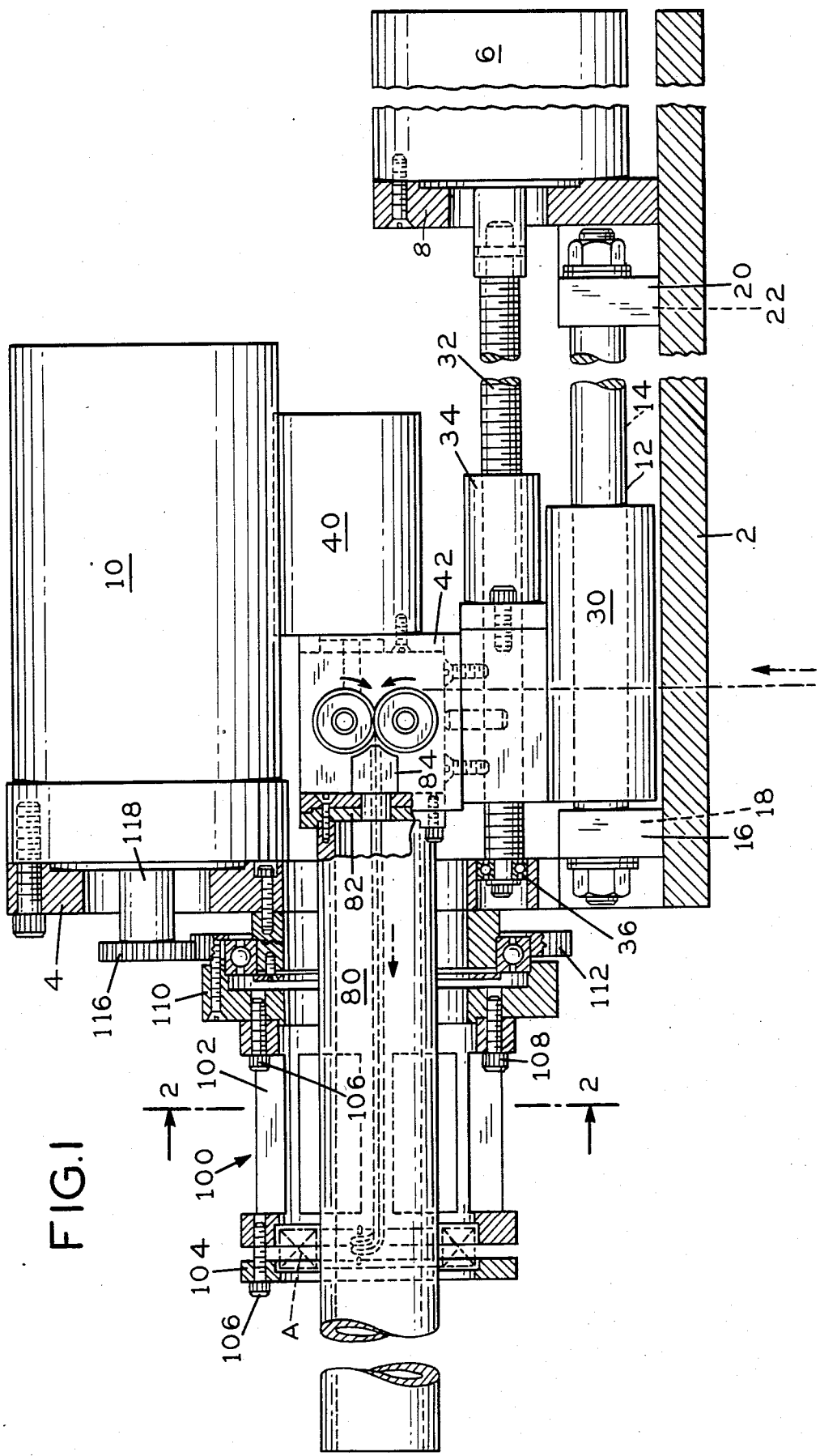
Figure 2:
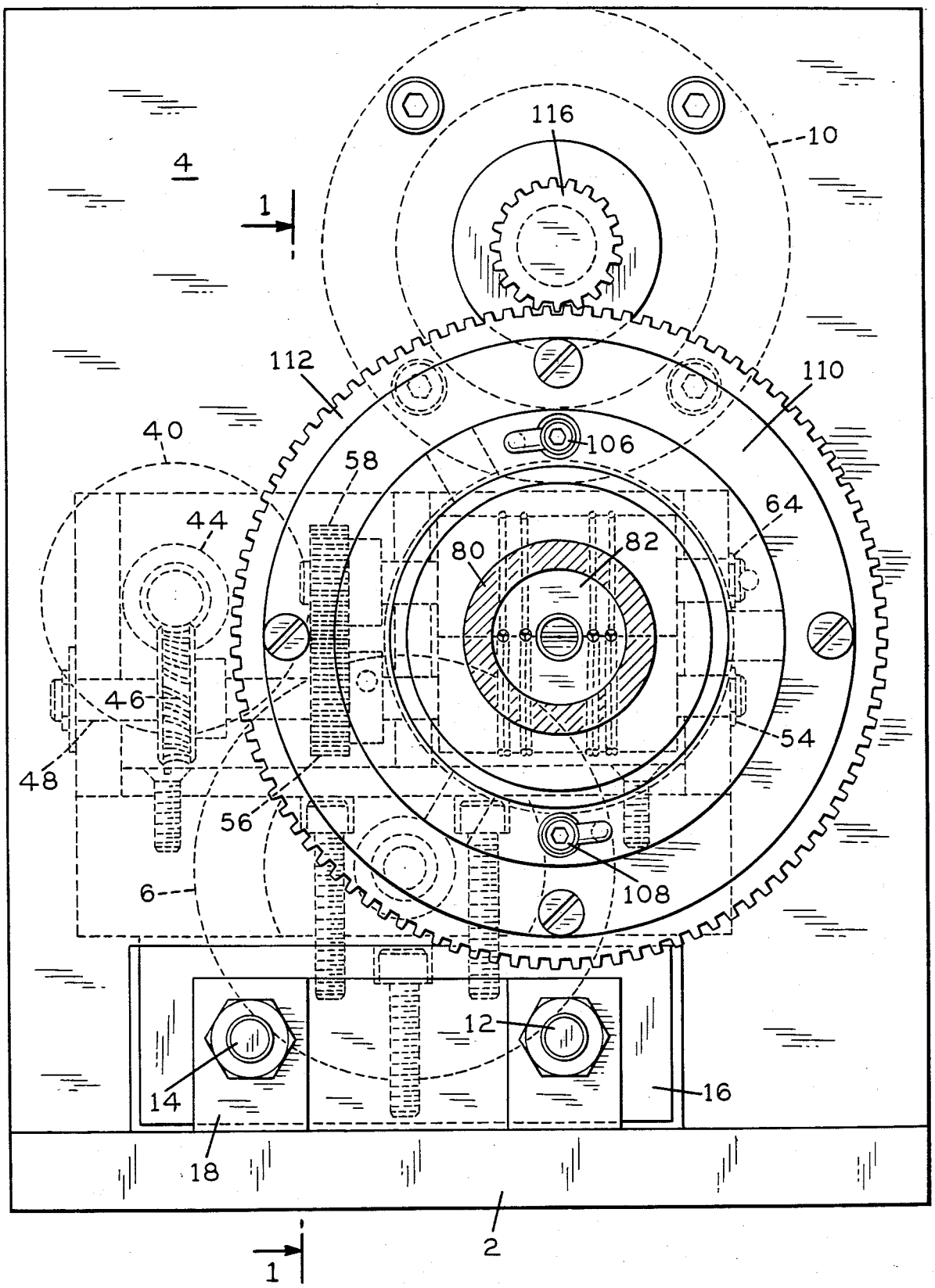
FIG. 2 is a front view partly in section at 2—2, FIG. 1, of the apparatus of FIG. 1.

Referring to the drawings, particularly FIGS. 1 and 2 thereof, the apparatus of the instant invention includes base 2 having fixed thereto support 4. Motor 6 is mounted by plate 8 on base 2. Motor 10 is mounted on support 4. Guide rods 12, 14 are fixed at one end to mountings 16, 18 on base 2 and, at their other end, to mountings 20, 22 on base 2. Wire feed mounting block 30 is mounted for sliding along guide rods 12, 14 relative to base 2 and support 4 for reasons more apparent later herein. Motor 6 drives lead screw 32 which, through follower 34 fastened to block 30, advances block 30 toward and away from support 4 for reasons also more apparent later herein. At its forward end, lead screw 32 is mounted in support 4 in bearing 36.

Motor 40, FIGS. 1-4, is mounted on frame 42, fixed to block 30. Motor 40, FIGS. 2, 4, drives worm 44 which, in turn, drives worm gear 46, keyed to shaft 48 which, by bearing 50, 52, 54, FIG. 4, is mounted for rotation on frame 42. Gear 56 is keyed to shaft 48 and is driven thereby. Gear 56 drives gear 58 keyed to shaft 60 mounted for rotation on frame 42 by bearings 62, 64. Wire feed drum 66 is keyed to and driven by shaft 48. Wire feed drum 68 is keyed to and driven by shaft 60. As best shown in FIGS. 4, 4A, "O" rings 72, 74 are mounted in a groove on drum 66 and "O" ring 76 is mounted in a groove on drum 68. For purposes more apparent later herein, "O" rings 72, 74 engage with "O" ring 76 for wire feed purposes. In the embodiment illustrated, there are two sets of "O" rings 72, 74 on wire feed drum 66 and two sets of "O" rings 76 on wire feed drum 68.

Figure 3:
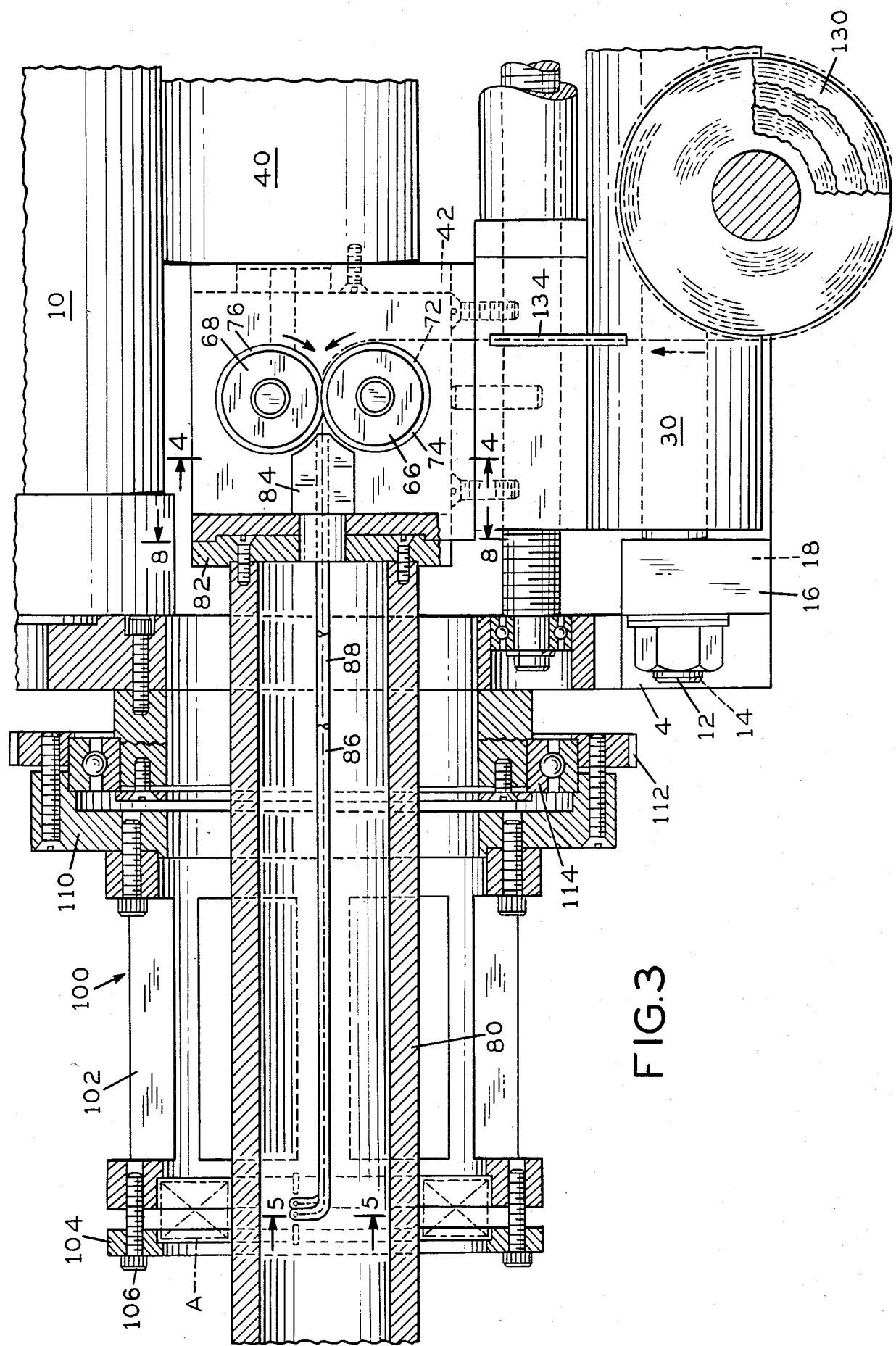
FIG. 3 is an enlarged view, in section, of a portion of the apparatus of FIG. 1.

As best shown in FIGS. 1 and 3, winding cylinder 80 is mounted by plate 82 on frame 42. For purposes more apparent later herein, wire guide 84 is mounted on the inner side of frame 42. Wire guide tubes 86, 88 pass through opening 90 in plate 82 into wire guide 84 and, at their opposite end, into holes 92, 94 in the wall of winding cylinder 80.

Stator holder, generally designated 100, FIGS. 1 and 3, includes base 102 and stator clamp 104, removably mounted on base 102 by allen screws 106, 108, FIGS. 1 and 3 for clamping a stator, shown in phantom at A FIGS. 1 and 3, for winding on the apparatus of the instant invention. At its inner end, stator holder 100 is mounted on holder 110 and ring gear 112 is mounted for rotation on support 4 on bearing 114. Gear 116, FIG. 1, on shaft 118 of motor 10 rotates, or indexes, stator holder 100 relative to winding cylinder 80 as will be later described.

For reasons more apparent from the description which follows, the apparatus of the instant invention is designed so that winding cylinder 80 fits with relatively little clearance within the center or opening of stator A to be wound. Stator A in its center, or I.D., is provided with axially extending, equally spaced grooves into which the wires to be wound and make up the winding coil are to be wound or placed. At either end of wire guide holes 92, 94, FIGS. 3, 6, 7, 8 and 9, winding cylinder 80 has fixed to its surface and projecting radially therefrom guides 120, 122. Guides 120, 122, as will be later described, project into the winding grooves in stator A, as the stator is being wound, to maintain the alignment between the wires being fed through guide holes 92, 94 and the stator groove and to embed the wire in the groove as the wire is fed thereto and placed therein.

Referring now to FIG. 3, wire supply spools 130, and in the embodiment described there are four such spools, are mounted on spool spindle 132 and feed wire through guides 134 to wire feed drums 66, 68, between the "O" rings 72, 74 and 76 on such drums.

In the operation of the apparatus of the instant invention and the practice of the method thereof, stator A, to be wound, is mounted on stator holder 100 by locking the stator between base 102 and clamp 104 with allen screws 106, 108. With wire supply spools 130 in place and the wire threaded from the supply spools through guides 134, between "O" rings 72, 74 and 76, wire guide tubes 86, 88 and holes 92, 94 of winding cylinder 80, winding of stator A can commence.

The winding of stator A in the instant application is carried out by advancing and retracting winding cylinder 80 through the center of stator A, clamped in holder 100, by indexing or rotating stator A relative to winding cylinder 80 and wire feed holes 92, 94 by indexing or rotating holder 100 at the times prescribed while wire feed holes 92, 94 and guides 120, 122 are fully advanced through or withdrawn from stator A and, while these steps are carried out, feeding the wire to be wound from spools 130 between feed drums 66, 68 and wire feed holes 92, 94 at the required rates.

The advancement and retraction of winding cylinder 80 through stator A is accomplished through the advance and retraction of block 30, frame 42 and the parts associated therewith, by lead screw 32 driven by motor 6. Motor 6 is, preferably, a D.C. Servo Motor having a speed capability of 1800 RPM and, as best shown by block diagram in FIG. 10, in addition to driving lead screw 32 drives tachometer 140 which, in turn, enables the speed of motor 6 to be controlled by computer 144 in accordance with the program for the stator to be wound.

The indexing or rotation of stator A to be wound and stator holder 100 relative to winding cylinder 80 is accomplished by motor 10. Motor 10, preferably, is a D.C. constant speed motor, is reversible for reasons more apparent later herein, and has an accuracy of ±0.5° which is not cumulative. Thus, in each indexing from one angle to the next an accuracy of ±0.5° is maintained. Motor 10 also drives tachometer 146 and, through tachometer 146, encoder 148 connected to programmed computer 144.

The feed of wire from wire spools 130 through guides 134 by wire feed drums 66, 68 and "O" rings 72, 74 and 76 and through wire feed guides 86, 88 and feed holes 92, 94 is by feed motor 40, preferably a D.C. Servo motor operating in one direction at a controlled speed. Motor 40 also drives tachometer 150 and, through tachometer 150, encoder 152 connected to programmed computer 144.

Both the longitudinal motion of cylinder 80, in advancing and retracting cylinder 80 through the stator being wound, and the rotational motion of the stator relative to cylinder 80, in indexing or rotating the stator being wound from one stator slot wound to the next stator slot to be wound, are driven by a numerical controller which has the capability of contouring control, switchable between X and Z or Y and Z axes. During longitudinal motion of cylinder 80, wire feed by motor 40 is proportional to the longitudinal motion. During rotational motion, wire feed by motor 40 is proportional to the rotary motion. The constants of these proportioning relationships are separately programmed in computer 144.

A stator turn is wound on a stator in the method and with the apparatus of the instant invention by four consecutive, coordinated motions. With the wire feed holes or apertures 92, 94 and guides 120, 122 aligned with and slightly in advance of the stator slot or groove to be wound, cylinder 80 is advanced a distance slightly greater than the stator width until guides 120, 122 are clear of the slot or groove. As cylinder 80 advances, motor 40 is energized to feed a wire or a plurality of wires, as the case may be, at a speed proportional to the speed of advance of cylinder 80 and in a length substantially equal to the longitudinal motion of cylinder 80. During this longitudinal motion of cylinder 80, the stator and stator holder 100 are fixed against rotating or indexing motion.

After cylinder 80 has advanced, guides 120, 122 have cleared the stator slot and the wire or wires are in the slot, motor 6 stops, the advance of cylinder 80 through the stator is stopped and cylinder 80 is held in fixed advanced position. The stator and stator holder 100 are then rotated, rotating or indexing the stator to the next stator slot to be wound and aligning guides 120, 122 with such next stator slot. As the stator and stator holder 100 are rotated or indexed to alignment with the next slot center, motor 40 is energized to the speed of rotation of the stator and holder, to feed the wire or wires, as the case may be, at a speed proportional to the speed of rotation or advance of the stator and holder. Thus, the end turn of the stator coil winding is formed.

With guides 120, 122 and wire feed holes or apertures 92, 94 in alignment with the next slot to be aligned, motor 6 is again energized but in the reverse direction from the previous energization. Motor 6 moves cylinder 80 longitudinally of the stator, returning guides 120, 122 and wire feed apertures 92, 94 to the original side of the stator. While motor 6 is energized, motor 40 is also energized to the speed of advance of cylinder 80 to feed wire or wires, as the case may be, to the slot being traversed by guides 120, 122 and apertures 92, 94. In each instance of slot traverse, the leading guide of guides 120, 122, guide cylinder 80 and apertures 92, 94 along the slot while the following of the guides 120, 122 presses the wire feed from apertures 92, 94 into the traversed slot. During reverse travel of cylinder 80, as in the case of forward travel, cylinder 80 is fixed against rotary or indexing motion.

After guides 120, 122 and apertures 92, 94 of cylinder 80 have cleared the slot, longitudinal motion of cylinder 80 is again stopped by stopping motor 6. Motor 10 is then energized by the programmed computer 144 rotating the stator and stator holder 100 relative to cylinder 80, apertures 92, 94 and guides 120, 122 until guides 120, 122 and apertures 92, 94 are in alignment with the next stator slot to be wound. During such rotary motion of the stator and stator holder 100, motor 40 is also again energized by computor 144 to the speed of rotation of the stator and holder to feed wire at the speed equal to the speed of rotation, advance or indexing of the stator and stator holder relative to cylinder 80. With guides 120, 122 and apertures 92, 94 in alignment with the next stator slot to be wound, the previous winding is complete and cylinder 80, the stator and stator holder 100 are in position to commerce the next winding.

The combinations of stator slots to be wound in each turn is determined by the stator design. The stator design and winding instructions for such design are compiled in a simple programming language compatible to the computer being used and can be stored on a magnetic tape, paper tape or disc depending upon the computer equipment.

Depending upon the stator design, a single wire or a plurality of wires might be wound in each slot in each traverse of cylinder 80 of the stator. A plurality of windings might be simultaneously wound. Thus, for example, as best shown in FIG. 5, cylinder 80 may be provided with two sets of apertures 92, 94 and two sets of guides 120, 122, each set laying down a wire or wires, as the case may be, in an aligned stator slot as cylinder 80 traverses the stator and is then rotated. Thus, two phases might be simultaneously wound. By adding additional sets of apertures 92, 94 and guides 120, 122, additional phases, for example, a three-phase motor stator might be wound.

In addition to speed of winding, costs, and the like, the simultaneous winding of a plurality phase in a multiphase motor with the apparatus of the instant invention, provides a more uniform and better match between the motor phase windings, less heat loss in the motor operation and a more uniform and more efficient motor.

Once programmed into the computer control 144 of the instant invention, the stator has been positioned and locked in holder 100, the stator has been aligned and winding is commenced, winding of the stator may be carried out and completed by the apparatus. A stator which requires one hour for winding in conventional manner is wound on the instant apparatus in ten minutes.

There are numerous safety arrangements, such as overload switches, clutches and the like which might be employed in the instant apparatus should a malfunction occur during operation. Preferably, a foot switch pedal is provided which, when depressed, initiates the apparatus operation. So long as the pedal is held depressed, the apparatus will continue operation until the program is completed and the stator is wound. At the completion of winding, the apparatus automatically stops irrespective of the pedal being held depressed. If, during operation, a malfunction should occur, the pedal is released by the operator and the apparatus stops. When the malfunction has been cleared, the cycle can be completed by merely re-depressing the pedal.

As shown diagrammatically in FIG. 11, once winding of stator A is commenced by the pre-programmed computer at stator slot 1, winding continues continuously until winding of the stator is completed. The winding and wire wound is continuous. Thus, in the illustrated winding, winding of the stator continues in the direction of the arrows from starting point B, slot 1 to finish point C, slot 19. Concurrent with such winding, in the embodiment illustrated, a second winding or phase is simultaneously wound, as partially illustrated in broken line, commencing at D, slot 10. Obviously, except for the difference in stator slots, the second winding, wound concurrently, will have the same configuration as the winding between B and C.

After winding is completed, the wires may be pressed into the slots, and the wire loop at the ends of the stator laced all in conventional manner.

Programmed computer 144, FIG. 10, can include a wide variety of programmable controls. In the practice of the instant invention a machine tool control, sold by Summit/Dana, Bozeman, Minnesota, under the name Bandit has been found to be satisfactory. Preferably, the control is programmed from an external source, such as a magnetic tape.

A typical computer program found useful for winding a particular stator with lap winding pitch of 1–5 is, as follows:

X controls angular rotation, i.e., X .0833 gives 60° (X 1.0 gives 720°).
Y controls ram movement, i.e., Y .10 gives 2.5" (Y 1.0 gives 25")
Z controls wire feed, i.e., Z 1.0 gives 2.7".
Z Commands are combined in a contouring routine (X or Y enter Z store).

| | |
|---|---|
| X ± .0833 Z .28 | ± 60° rotation with wire feed of .756 inches. |
| Y ± .08 Z .65 | ± 2.0" ram motion with wire feed of 1.755 inches. |

Winding head is initially set up to be in center of core, allows for lining up slots with guides.
Subroutines are given letter labels, but must be called by line numbers which are determined after programs are written - on paper or machine.

| | | Main Program - To wind WD-3022 MODIFIED as lap winding pitch 1-5 |
|---|---|---|
| | 1 G70 | 1st step allows G70 routine to check inch position of switch. |
| | 2 F100 | Sets speed at 100 inches/minutes for combined movement. |
| | 3 Y-.04Z.32 | Moves ram to end of stroke (−dir.) from center of core position. Z command feeds wire .864 inches. |
| | 5 /NC26 | Calls coil winding subroutine at C to wind coil 1 of pole 1 CW. |
| | 6 /NH34 | Calls subroutine H to wind coils #2 & 3 of pole 1 CW. |
| | 7 /NJ43 | Calls subroutine J to wind all 3 coils of pole #2 CCW. |
| | 8 X-.0833Z.5 | Moves −60° to slot 13 in position to wind pole #3. |
| | 10 /NB24 | Calls coil wind subroutine at B to wind coil 1 of pole 3 CW. |
| | 11 /NH34 | Calls subroutine H to wind coils 2 & 3 of pole 3 CW. |
| | 12 /NJ43 | Calls subroutine J to wind all 3 coils of pole 4 CCW. |
| | 13 Y.065Z.55 | Pulls ram out of stator. |
| | 15 X.0833Z.4 | Rotates stator 60° back to slot #1. (Starting point). |
| | 17 /Z3. | Feeds wire for end of winding (leads) at high speed. |
| | 18 M00 | Stops machine. Awaits new closure of foot switch. Wound stator is removed at this point. |
| | 19 Y-.105 | Returns ram to starting position. |
| | 20 /Z2 | Feeds wire for beginning of winding (leads) at high speed. |
| | 21 M02 | Stops machine & resets program to step #1. New unwound stator is inserted at this point. |
| | | Coil Winding Subroutine |
| A | 22 X.0833Z.28 | +60° rotation, with .756 inches of wire is fed. |
| B | 24 Y-.08Z.65 | Stroke (−dir.) ram out with 1.755 inches of wire. |
| C | 26 X-.0833Z.28 | −60° rotation, same wire feed. |
| | 28 Y.08Z.65 | Stroke (+dir.) ram in. |
| | 30 /Gtrs.12 | Repeat for number of turns/coil desired. |
| | 31 NA22 | Repeats back to line no., is skipped when repeat number is reached. |
| | 32 G92 | Internal program resets counters to zero. |
| | 33 /N0 | End of subroutine. |
| | | Subroutine to Wind Coils #2 & #3 on Poles 1 & 3 CW |
| H | 34 X.0625Z.36 | +45° rotation. |
| | 36 /NB24 | Call coil winding subroutine at B. |
| | 37 X.0625Z.36 | +45° rotation. |
| | 39 /NB24. | Call subroutine B. |
| | 40 X0G60 | Mirro image of X axis command. (Reverses direction of winding coils from CW to CCW. |

-continued

|   |    |           |                                                                                                  |
|---|----|-----------|--------------------------------------------------------------------------------------------------|
|   | 42 | /NO       | End of subroutine.                                                                               |
|   |    | Subroutine to | Wind 3 Coils on Poles 2 & 4 CCW                                                              |
| J | 43 | X.0833Z.4 | +60° rotation.                                                                                   |
|   | 45 | /NB24     | Call subroutine B.                                                                               |
|   | 46 | X.1041Z.5 | +75° rotation.                                                                                   |
|   | 48 | /NB24     | Call subroutine B.                                                                               |
|   | 49 | X.1041Z.5 | +75° rotation.                                                                                   |
|   | 51 | /NB24     | Call subroutine B.                                                                               |
|   | 52 | G60       | Mirro image of X axis cancelled. (Removes reversal direction that coils are wound-back to CW.) |
|   | 53 | /NO       | End of subroutine.                                                                               |

The apparatus of the instant invention might be modified for programmed winding of conventional D.C. motors by inverting cylinder 80 and holder 100. Thus, for winding a D.C. motor, the longitudinally movable member might be the holder and the rotatable holder the member for inserting the wires. Such modification might also be used for programmed winding of A.C. motors, tachometers, resolvers and alternators.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A winding machine for a stator with inwardly facing slots comprising:
    means for holding said stator;
    a cylindrical winding member, closely fitted to the inside circumference of said stator and extending beyond the ends of said stator at all times during the winding process, to prevent wire from escaping from the inwardly facing slots of the stator, and having a wire-dispensing aperture on its outside diameter;
    wire-dispensing means for pushing wire through the aperture;
    reciprocation means for producing longitudinal relative motion between said cylindrical winding member and said stator; and
    rotation means for producing rotary relative motion between said cylindrical winding member and said stator.

2. The device of claim 1 further comprising means for regulating the speed and length of wire pushed in coordination with said longitudinal relative motion and said rotary relative motion.

3. The device of claim 2 in which the length of wire pushed is proportional to the travel distance of said motions.

4. The device of claim 1 in which the clearance between the outside diameter of said cylindrical winding member and the inside diameter of said stator is less than the diameter of said wire.

5. The device of claim 1 in which said rotation means maintains registration between said slots and said aperture during said longitudinal motion.

6. The device of claim 1 in which said cylindrical winding member is moved by said reciprocation means and said holding means is rotated by said rotation means.

7. The device of claim 1 in which said motions, speed and length of wire pushed are controlled by a programmable controller.

8. The device of claim 1 in which said motions, speed and length of wire pushed are controlled by a computer.

9. The device of claim 1 in which said cylindrical winding member has two or more wire-dispensing apertures and an equal number of wire-dispensing means.

10. The device of claim 9 in which two of said wire-dispensing apertures are located 180 degrees apart in a plane normal to the axis of said cylindrical winding member.

11. The device of claim 9 in which three of said wire-dispensing apertures are located in a plane normal to the axis of said cylindrical winding member.

12. The device of claim 9 in which two or more wire-dispensing apertures are closely spaced in a line parallel to the axis of said cylindrical winding member, and there are an equal number of wire dispensing means.

* * * * *